United States Patent [19]

Moon

[11] 4,274,791
[45] Jun. 23, 1981

[54] TOWING AND HOISTING APPARATUS

[76] Inventor: Gary D. Moon, 239 Vista Del Mar, Cannon Beach, Oreg. 97110

[21] Appl. No.: 971,369

[22] Filed: Dec. 20, 1978

[51] Int. Cl.$^3$ ............................................. B60P 3/00
[52] U.S. Cl. .................................. 414/563; 212/160; 212/231
[58] Field of Search .................. 414/563, 687; 212/87, 212/53, 55; 280/402, 476 R

[56] References Cited

U.S. PATENT DOCUMENTS

| | | | |
|---|---|---|---|
| 1,611,326 | 12/1926 | Abbe | 212/55 |
| 2,197,406 | 4/1940 | Fleming | 414/563 |
| 2,804,216 | 8/1957 | Farnam | 212/53 |
| 3,044,635 | 7/1962 | Kirsten | 212/55 |
| 3,313,432 | 4/1967 | Sheldrew | 414/563 |
| 3,924,763 | 12/1975 | Pigeon | |

*Primary Examiner*—Leslie J. Paperner
*Assistant Examiner*—Lawrence E. Williams
*Attorney, Agent, or Firm*—Robert C. Walker

[57] ABSTRACT

Apparatus for towing and hoisting vehicles to be serviced is described. Concepts and techniques for enabling effective capability under varied conditions of terrain and footing are discussed. Specific apparatus described combines an extendable boom which is rotatable about a center post and lateral stabilizers on the truck afterbody. Top and bottom rollers on the base tube of the boom guide the outreach arm of the boom to a retracted position around a hydraulic actuator within the base tube. Side mounted actuators rotate the boom about the center post.

10 Claims, 4 Drawing Figures

TOWING AND HOISTING APPARATUS

BACKGROUND OF THE INVENTION

1. Field of the Invention

This invention relates to vehicle hoisting and towing apparatus, and more specifically to such apparatus employing hydraulic means for positioning and operating the towing boom.

2. Description of the Prior Art

The most advanced vehicle hoisting and towing apparatus in use today commonly employ multiple hydraulic actuators and controls. Such actuators and controls are capable of positioning the towing boom in proximity to the vehicle to be serviced and are capable of raising the vehicle into service and towing positions. U.S. Pat. Nos. 3,620,393 to Bubik, entitled "Vehicle Towing Assembly" and 3,908,842 to Place entitled "Tow Truck" are representative of such apparatus. In each instance hydraulic actuators are employed to position the end of a towing boom in proper aspect to the towed vehicle and are used to raise the towing sling into the operative position. The concepts disclosed are useful in their intended environments but have limited utility under adverse conditions of terrain and footing.

For example, in mountainous terrain where the vehicle to be serviced lies at the foot of a steep embankment, the ability of the towing mechanic to work the hoisting operation is limited to the confines of the rearwardly extending boom. Additionally, in soft footings such as beach sand or roadside gravel, the hoisting operations is limited by the range of lateral stability of the towing vehicle. Although most towing vehicles ae not called upon to perform in such adverse conditions, vehicles along the West Coast of the United States commonly work both rugged mountain and expansive beach environments. To fill a need for flexible and adaptable vehicles in this region, mechanics and engineers are continually in search of new concepts for expanding hoisting capabilities while ensuring operator safety.

SUMMARY OF THE INVENTION

A primary aim of the present invention is to provide a towing vehicle having expanded capabilities in multimission use. A facility to operate on rugged mountain slopes and in beach sand is sought as well as enhanced flexibility and safety in conventional towing operations. Specific objects in detail embodiments include control of the towing boom from a plurality of operator consoles and enhanced lateral stability of the vehicle body.

Accordingly to the present invention the extendable boom of vehicle towing and hoisting apparatus is adapted for rotation about a center post to effect lateral displacement of the end of the boom, and is engaged by a pair of hydraulic actuators mounted in opposing relationship, one to each side of the boom to effect said rotation.

According to one detailed embodiment of the invention a hydraulic actuator for raising and lowering the boom is hingedly affixed at one end to the extendable boom and at the other end is mounted for rotation about the center post.

According to a yet further detailed embodiment of the invention a hydraulic actuator is mounted within the base tube of the boom and the outreach arm of the boom is mounted between a top and bottom roller such that the outreach arm is guideable to a retracted position around the hydraulic actuator within the base tube of the boom.

A primary feature of the present invention is the extendable boom including the side mounted, opposing actuators for rotating the boom about the center post. In one detailed embodiment a hydraulic actuator drives the outreach arm of the boom. The boom is guideably mounted in the base tube for retraction around the actuator. A top roller and a bottom roller mounted outwardly of the top roller are employed. Other features of detailed embodiments include an upright frame which collaterally serves as a reservoir for hydraulic fluid, and a hydraulic actuator for raising and lowering the boom which is mounted for rotation around the center post. Lateral stabilizers is at least one embodiment extend from underbody of the vehicle bed. In other embodiments a plurality of operator consoles are provided.

A primary advantage of the present invention is enhanced hoisting capability such as is provided by the combination of the lateral displacement boom and the truck body stabilizers. Operator safety is improved through the use of multiple operator consoles which enable the operator to stand clear of the operating machinery during the hoisting operation or to gain an advantageous view of the workpiece as the workpiece is displaced. Free movement of the outreach arm to a retracted position around the hydraulic actuator is enabled by the top and bottom rollers of the base tube. Precise control of the towing boom for placing the end of the boom in proper aspect to the workpiece is enabled through the combined use of multiple hydraulic actuators. In other embodiments the need for a holding tank for hydraulic fluid is avoided through the use of the support frame as a reservoir.

The foregoing, and other objects, features and advantages of the present invention will become more apparent in the light of the following detailed description of the preferred embodiment thereof as shown in the accompanying drawing.

DETAILED DESCRIPTION

Figure 1:
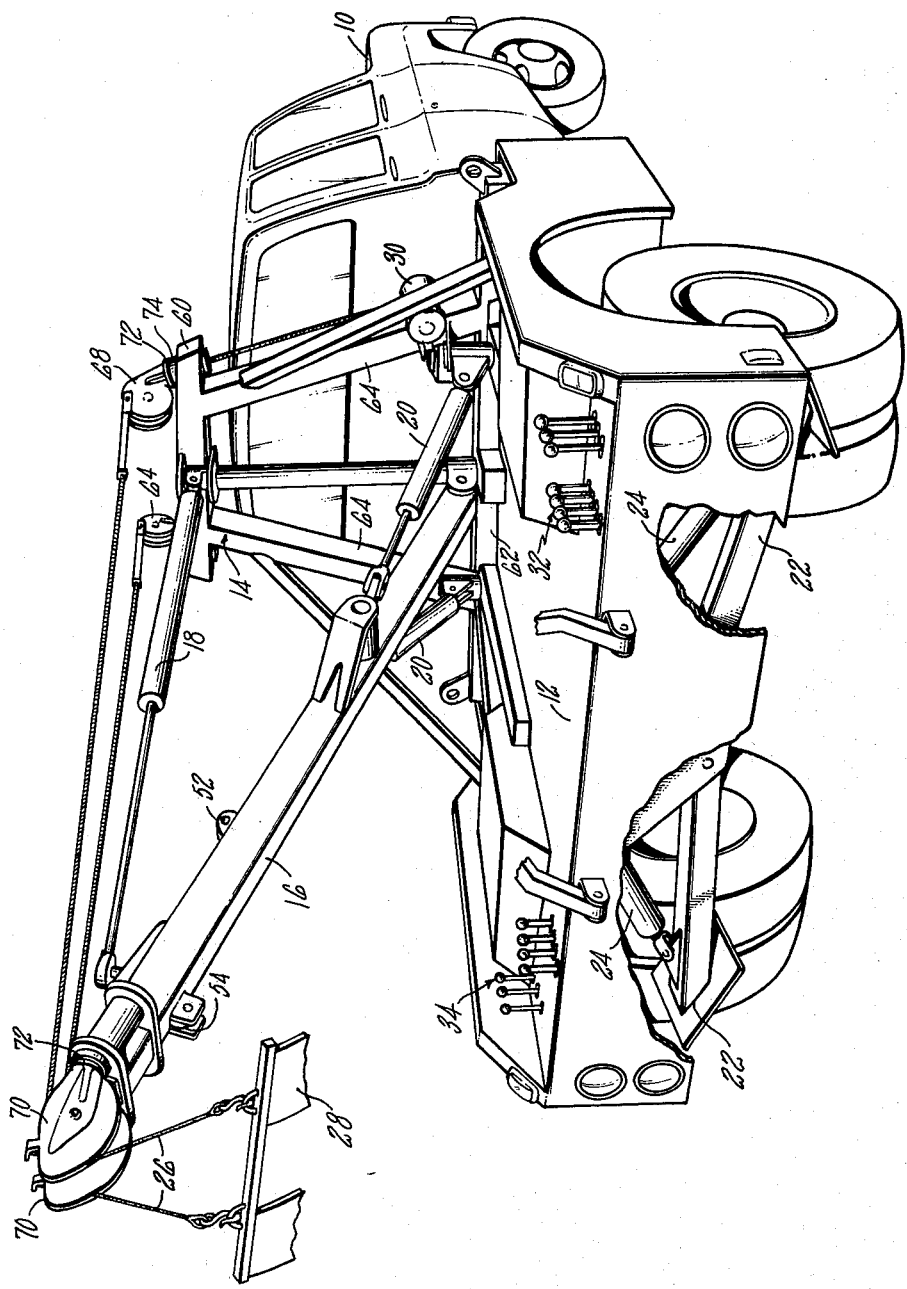
FIG. 1 is a simplified, perspective view showing hoisting and towing apparatus constructed in accordance with the present invention.

Towing and hoisting apparatus embodying the concepts of the present invention is illustrated in FIG. 1. The apparatus is mounted on a truck 10 having an essentially flat afterbody 12. An upright frame 14 supports a towing boom 16. The boom is of the extendable type and has a hydraulic actuator (not viewable in FIG. 1) contained within the boom for extending the boom. The towing boom is positionable in the vertical direction by a hydraulic actuator 18 which extends from the upright frame to the boom. The towing boom is positionable in the lateral direction by a pair of opposing hydraulic actuators 20 which extend from the frame to opposing sides of the boom. A pair of lateral stabilizers or outriggers 22 extend from the afterbody of the truck and are positionable by hydraulic actuators 24. Towing cables 26 extend over the upright frame and the towing boom to a towing harness 28 from a hydraulically operable winch 30. A right, operator console 32 and a left, operator console 34 are positioned on the rear corners of the afterbody.

Figure 2:
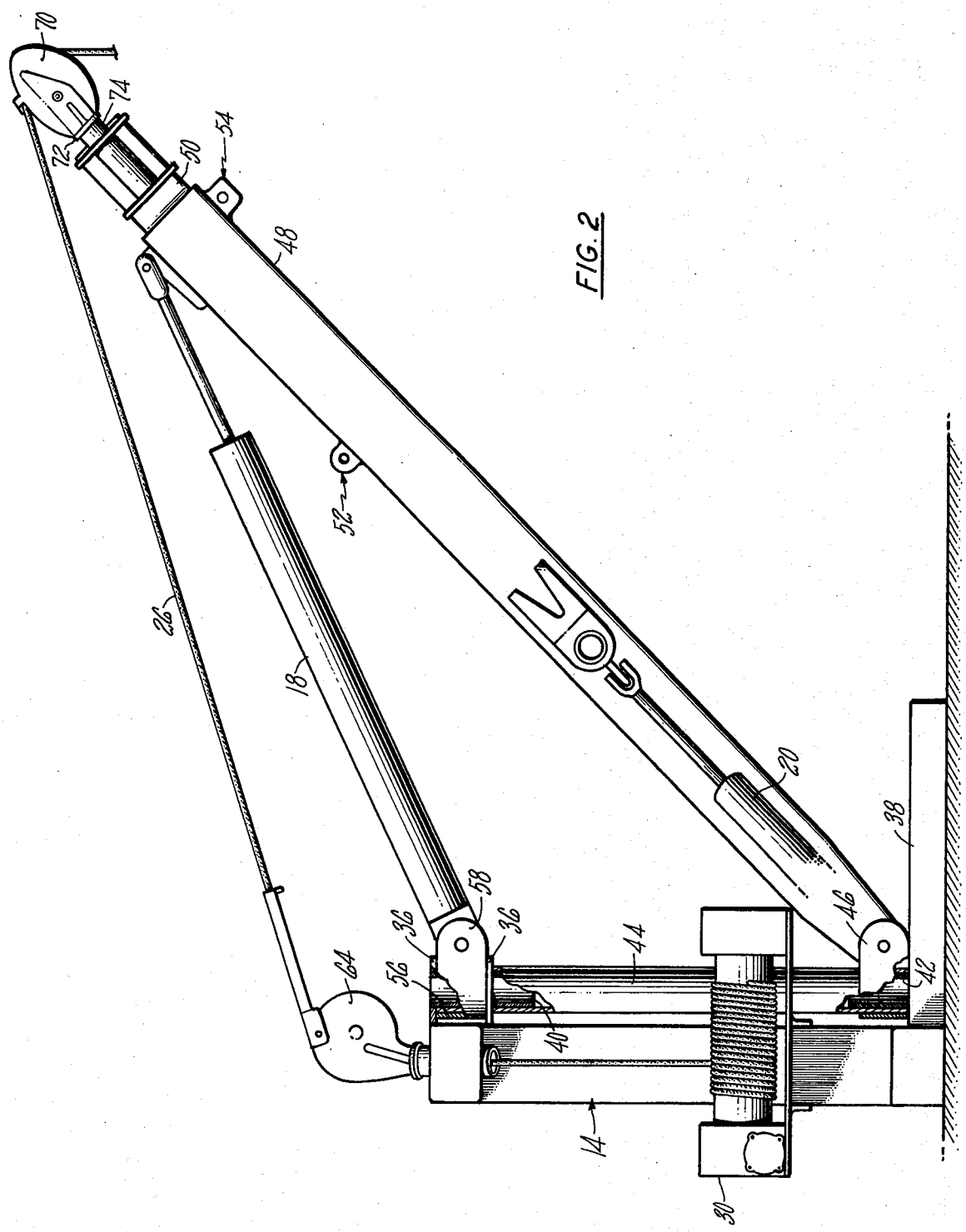
FIG. 2 is a side elevation view of the FIG. 1 apparatus including portions broken away to reveal structural features of the apparatus.
Figure 3:
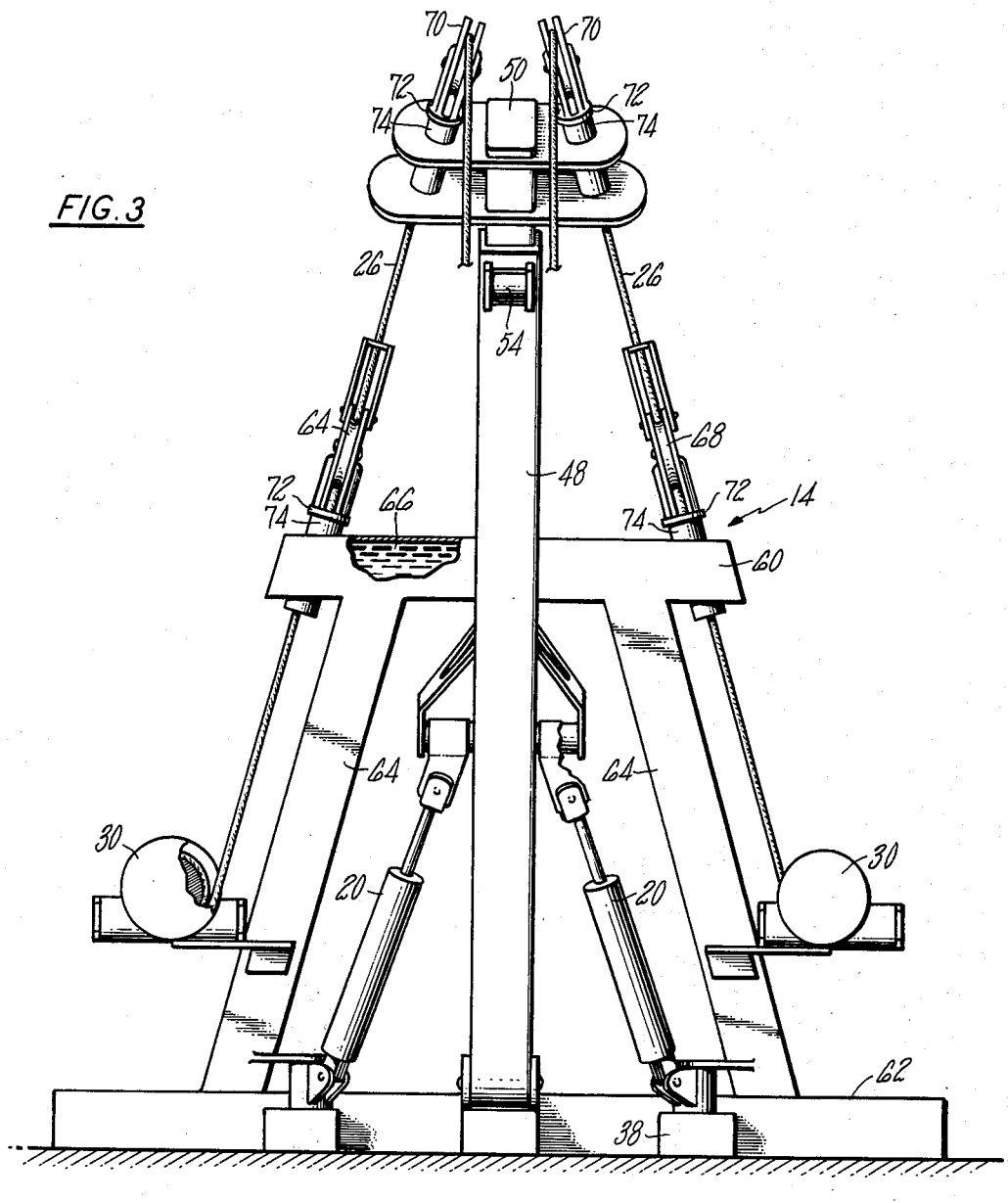
FIG. 3 is a rear view of the FIG. 1 apparatus including portions broken away to reveal structural features of the apparatus.

Details of the towing and hoisting apparatus are more readily viewable in the FIG. 2 and FIG. 3 views. In FIG. 2, top braces 36 and a bottom brace 38 extend rearwardly from the upright frame 14 to support a vertical center post from which the towing boom is hung. In the apparatus shown the center post is split and comprises a top post 40 and a bottom post 42. A first support tube 44 for the boom is engaged by the top and bottom posts and is rotatable thereon. A hinge 46 is affixed to the bottom of the tube 44 and extends rearwardly to engage the bottom of the towing boom. The towing boom is formed of a base tube 48 extending outwardly and upwardly from the hinge 46, and an outreach arm 50 which is retractable within the base tube. A top roller 52 and a bottom roller 54 extend into the interior of the base tube to guide the outreach arm into the retracted position. A second support tube 56 extends between the top braces 36 and is engaged by the top post 40. The tube 56 is rotatable on the top post. A hinge 58 is affixed to the tube 56 and extends rearwardly to engage one end of the hydraulic actuator 18. The other end of the actuator 18 is attached to the outward end of the base tube. One of the pair of side mounted actuators 20 is illustrated as attached to the side of the base tube 48. Both side actuators are viewable in FIG. 3.

In FIG. 3, the upright frame 14 is shown to include a top horizontal bar 60 and a bottom horizontal bar 62 which are joined by a pair of stanchions 64. A portion of the upright frame 14 is cut away to reveal the hollow interior of the upright frame. A reservoir 66 for hydraulic fluid is formed within the interior of the frame. The towing cables 26 extend from drums on the winches 30 over a first set of pulleys 68 at the top of the frame and over a second set of pulleys 70 at the end of the outreach arm 50. Each of the pulleys is mounted on a shank member 72 which is insertable in a corresponding bushing 74 to enable the pulley to be rotatable about the axis of the bushing in which the shank is mounted. Each of the bushings 74 and the pulley mounted therein are canted toward the axis of the towing boom. Each end of the opposing, actuators 20 are mounted to enable both lateral and vertical degrees of freedom.

Figure 4:
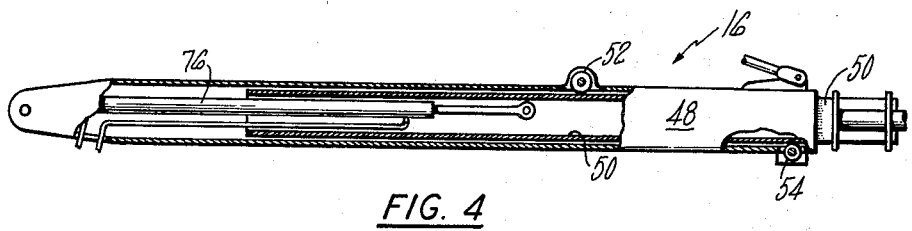
FIG. 4 is an illustration of the towing boom including portions broken away to reveal the internal relationship of the outreach arm within the base tube.

FIG. 4 is a cut-away view of the towing boom 16 showing internal features of the boom. A hydraulic actuator 76 is mounted internally of the base tube 48. The outreach arm 50 is retractable into the base tube around the actuator 76. The top roller 52 and the bottom roller 54 spaced outwardly therefrom guide the outreach arm into the base tube to prevent interference of the outreach arm with the actuator 76 or hydraulic lines leading thereto. Both the base tube and the outreach arm have essentially rectangular cross sections.

In one embodiment the top and bottom bars and the stanchions of the upright frame 14 are fabricated from steel tubing having a width of six (6) inches, a height of four (4) inches and a thickness of one quarter ($\frac{1}{4}$) of an inch. In the same structure the base tube 48 of the boom is fabricated from steel tubing having a width of four (4) inches, a height of six (6) inches and a thickness of three eighths ($\frac{3}{8}$) of an inch, and the outreach arm 50 is fabricated of steel tubing having a width of three (3) inches, a height of five (5) inches and a thickness of three eights ($\frac{3}{8}$) of an inch. The cylinder of the hydraulic actuator 76 within the base tube is two and one quarter ($2\frac{1}{4}$) inches in diameter and forty-eight (48) inches in length. The top post 40 and the bottom post 42 are fabricated of three (3) inch O.D. steel tubing and the first and second support tubes, 44 and 56, respectively are fabricated from three and one-half ($3\frac{1}{2}$) inch O.D. steel tubing. The remaining elements are sized correspondingly.

One important aspect of the invention is the combined effect of the laterally swinging boom and the outriggers at the rear of the afterbody. In hoisting operations on mountain slopes the towing vehicle may not be maneuverable to a conventional transverse position across the roadway. The outriggers when deployed stabilize the afterbody of the truck such that the boom may be rotated laterally to an operative position over the side of the afterbody. In other operations, deployment of the outriggers in loose footing, such as beach sand or roadside gravel, enable retrieval of the workpiece with the towing cables without entrapping the rear wheels of the tow truck in the loose footing.

Adding further flexibility, the outreach arm of the towing boom is extendable from the base tube such that the end of the boom overhangs the truck afterbody. The effectiveness of the apparatus in retrieving a workpiece from a steep slope is enhanced.

Each of the left and right operator consoles is provided with full control of all hydraulic actuators and winches. Accordingly, the operator can function in a position of maximum visibility while maintaining full control of the hoisting and towing apparatus. Again, such adaptability is particularly useful on mountain slopes where the boom is swung laterally to the afterbody and the only point of visibility is at the corner of the afterbody nearest the slope.

Although the invention has been shown and described with respect to preferred embodiments thereof, it should be understood by those skilled in the art that various changes and omissions in the form and detail thereof may be made therein without departing from the spirit and the scope of the invention.

Having thus described typical embodiments of my invention, that which I claim as new and desire to secure by Letters Patent of the United States is:

1. Vehicle towing and hoisting apparatus of the type adapted for mounting on the afterbody of a truck, comprising:
   an upright frame having a vertical center post affixed thereto; and
   an extendable towing boom which is hingeably pinned and rotatably hung at the base of the center post and which is formed of
   a base tube having a top roller and a bottom roller outwardly of the top roller,
   a hydraulic actuator within the base tube, and
   an outreach arm which is guideable by the top and bottom rollers to a retracted position around the actuating cylinder.

2. The invention according to claim 1 which further includes a pair of side mounted hydraulic actuators for rotating said extendable boom about the center post.

3. The invention according to claims 1 or 2 which further includes a hydraulic actuator for raising and lowering the boom which is affixed at one end to the base tube of the towing boom and at the opposing end to the center post such that the actuator is rotatable about the center post with the towing boom.

4. The invention according to claims 1, 2 or 3 which further includes a pair of outriggers attached to the afterbody of the truck wherein said outriggers are deployable to laterally stabilize the afterbody of the truck.

5. The invention according to claims 3 or 4 which further includes:
   a pair of hydraulic winches;
   a pair of first pulleys, each mounted on the top of said upright frame;
   a pair of second pulleys, each mounted at the end of the outreach arm; and
   a pair of towing cables each extending from one of said hydraulic winches over one of said first pulleys and over one of said second pulleys.

6. The invention according to claim 5 wherein the afterbody has a right rear corner and a left rear corner and which further includes a pair of operator consoles, one each positioned at said right rear corner and at said left rear corner for controlling the hydraulic actuators and the hydraulic winches.

7. The invention according to claim 6 wherein said upright frame has a hollow interior forming a reservoir for hydraulic fluid therein.

8. A tow truck of the type having vehicle hoisting and towing apparatus mounted on the afterbody thereof, said hoisting and towing apparatus comprising:
   an upright frame having a vertical center post affixed thereto;
   an extendable boom which is hingedly pinned and rotatably hung about the base of the center post, and which is formed of
      a base tube attached to said center post and having a top roller and a bottom roller outwardly of the top roller,
      a hydraulic actuator within the base tube for extending said boom, and
      an outreach arm which is guidable by the top and bottom rollers to an extended position and to a retracted position around the actuator;
   a pair of side mounted hydraulic actuators, each of which are attached at one end of the base tube of the extendable boom and at the other end to said upright frame for rotating said boom about the center post; and
   a hydraulic actuator for raising and lowering the boom about the hingedly pinned location, said actuator being fixed at one end to the base tube of the extendable boom and attached at the other end to the center post such that the actuator is rotatable about the center post with the extendable boom.

9. The invention according to claim 8 which further includes a pair of outriggers attached to the afterbody of the truck wherein said outriggers are deployable to laterally stabilize the afterbody of the truck.

10. The invention according to claim 9 wherein the afterbody has a right rear corner and a left rear corner and which further includes a pair of operator consoles, one each positioned at said right rear corner and at said left rear corner for controlling the hydraulic actuators.

* * * * *